May 7, 1940. F. P. SOLLINGER 2,199,655
TRUE-MOTION CONNECTING ROD
Filed Sept. 2, 1939
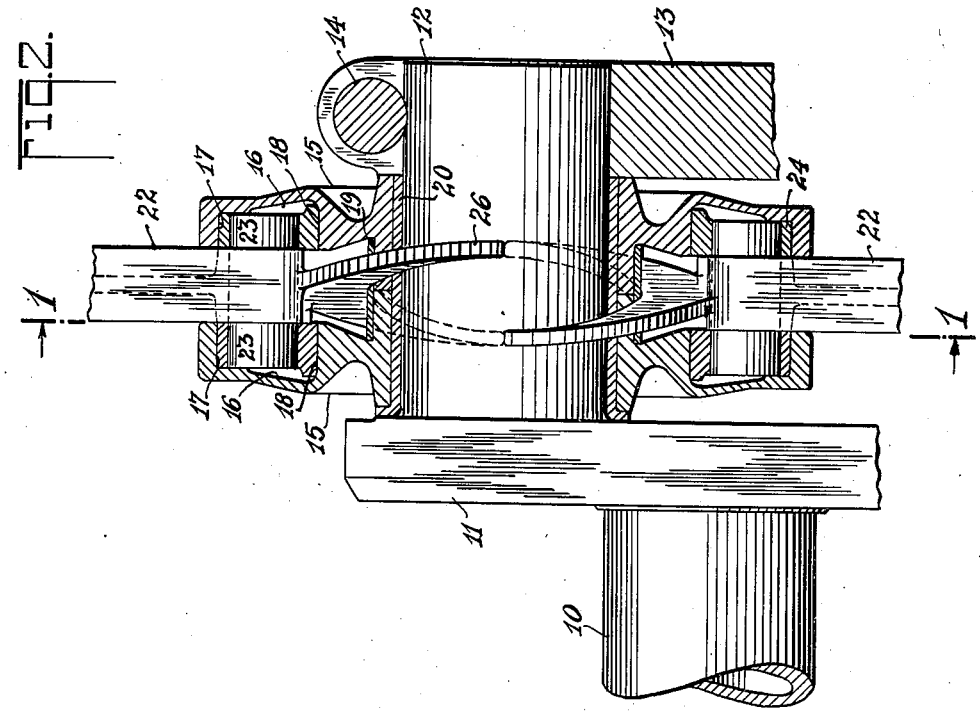
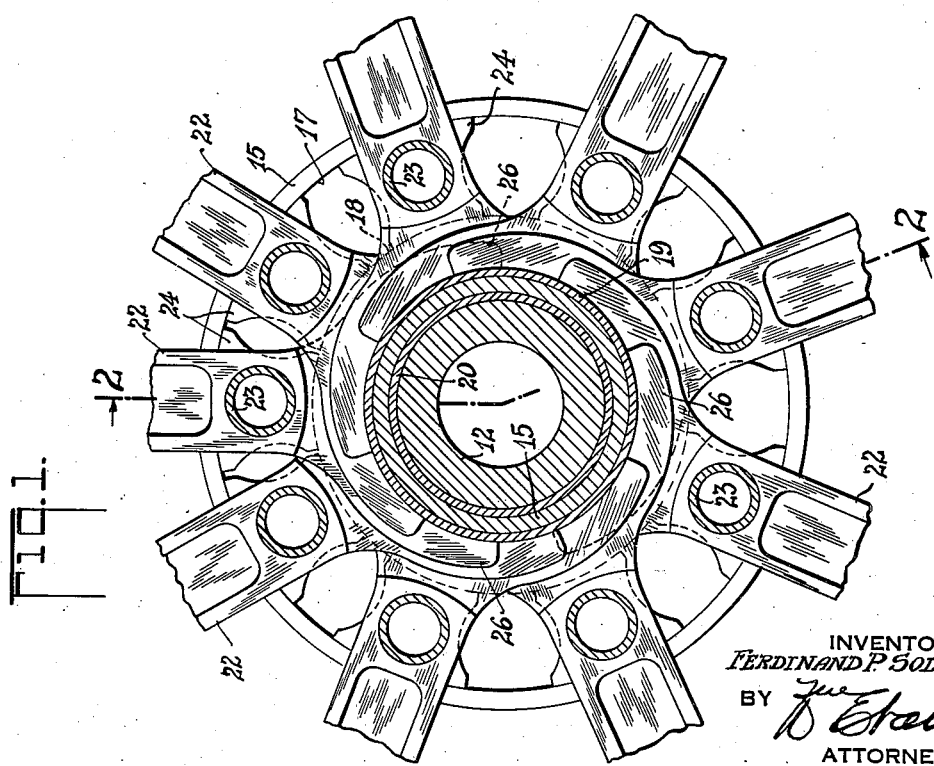
INVENTOR
FERDINAND P. SOLLINGER
BY
ATTORNEY Patented May 7, 1940

2,199,655

UNITED STATES PATENT OFFICE 2,199,655

TRUE-MOTION CONNECTING ROD

Ferdinand P. Sollinger, Paterson, N. J., assignor to Wright Aeronautical Corporation, a corporation of New York Application September 2, 1939, Serial No. 293,211

5 Claims. (Cl. 74—580)

This invention relates to radial engine connecting rods, and has for a principal object the provision of a true-motion connecting rod system in which all rods articulate about the crankpin center.

A further object is to provide a rod system in which each rod has a pair of articulated main bearing slippers engaging annularly grooved members free to rotate upon the crankpin, the members being further provided with a track engaged by stabilizing slippers on the rods, the slippers being so disposed as to have a substantial arcuate embracement of the crank pin and lying in overlapping relationship with respect to the stabilizing slippers of adjacent connecting rods.

Further objects will be apparent after reading the annexed description in connection with the drawing, in which:

Fig. 1 is an end view of the rod system showing the crankpin in section, comprising a section on the line 1—1 of Fig. 2; and Fig. 2 is a longitudinal section through the rod system comprising a section on the line 2—2 of Fig. 1.

A crankshaft is shown at 10 having the usual cheek 11 carrying a crankpin 12 supported at its rearward end by a rear crankcheek 13 clamped at 14 to the pin in the usual manner. Upon the crankpin are journaled similar opposed members 15 having opposed annular grooves 16 defining inwardly facing and outwardly facing tracks 17 and 18, and defining an inner, outwardly facing track 19. The annular members 15 are carried on a bearing 20 embracing the crankpin and are held in proper axial relation by the assembly of the rear cheek 13 upon the crankpin.

Between the members 15 are disposed a plurality of identical connecting rods having shanks 22 from which project stub pins 23 on either side thereof, these stub pins lying within the grooves 16 and having bearing slippers 24 articulated thereon for engagement at their outer and inner surfaces with the tracks 17 and 18. These slippers 24 sustain the main bearing loading, and have such arcuate embracement as to allow of relative angulation of adjacent connecting rods in accordance with the number of rods used and the general dimensions of the engine in which the system is used. To stabilize the rods from any appreciable angulation about the axes of the pins 23, each is provided with an integral stabilizing slipper 26 comprising a fork embracing substantially one-half of the crankpin and bearing upon the track 19. The slippers 26 are tilted from the plane of rotation and are sufficiently thin so that the slippers of adjacent rods may lie in overlapping relation to avoid interference therebetween. The relatively long moment arm afforded by the slippers 26 is effective in stabilizing the rod against tipping on the pin 23 and, as will be apparent, the substantial arcuate embracement of the slipper around the crankpin contributes to this non-tipping effect. It is known that in the prior art angled overlapping slippers have been used, but their function in the prior art structure is to sustain the primary explosion loads imposed on the system rather than merely to stabilize the rod against tipping. The articulated bearing shoes 24 are capable of slight angulation with respect to the rods by which they are endowed with greatly augmented load capacity due to the improved lubrication allowed by shoe tilting after the manner of Michell and Kingsbury thrust bearing principles. Accordingly, the combination of the articulated bearing shoes with the stabilizing slippers 26 affords an improved rod construction free from the objections of the prior art structures whose lubrication was difficult and whose bearing load distribution on account of elongated load-carrying slippers was faulty.

The rod system of this invention is adapted for nine-cylinder rod systems as shown, or for any number of rods. If the number of rods be less, such as seven, the thickness of the slippers 26 may be proportionately increased, whereas if the number of rods is increased, the thickness and angulation of the slippers 26 would be adjusted accordingly to allow of free relative angulation of the rods as dictated by engine dimensions. In normal operation, the annular members 15 will rotate together with respect to the crankpin, while the bearing surfaces between the shoes 24 and their tracks 17 and 18, and of the slippers 26 with respect to the track 19, will oscillate relative to each other according to the relative angulation of the connecting rods during operation. Alternatively, the members 15 could be locked to the crankpin with all relative motion taking place between the rod shoes and slippers and the tracks on the members 15.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a connecting rod system, a crankpin having opposed annularly grooved members thereon, a plurality of similar connecting rods each having substantially crescent-shaped inner end portions embracing substantially one-half of the crankpin, said inner end portions being thin and tilted from the plane of rotation so that the portions of adjacent rods overlap one another, pin stubs on the opposite sides of each rod opposite said annular grooves, and segmental bearing blocks carried on said pin stubs and engaging within said grooves.

2. In a connecting rod system, a crankpin having opposed annularly grooved members thereon, a plurality of at least seven similar connecting rods each provided with opposed stub pins, segmental bearing blocks on respective pins engaged with the opposed grooves of said annular members, and a stabilizing yoke on each rod comprising projections extending from the rod inner end around a portion of the crankpin, said extensions being acutely angled to the plane of rotation so that yokes of adjacent rods overlap one another.

3. In a radial connecting rod system on a crankpin wherein each similar rod is articulately connected to bearing shoes engaged with crankpin tracks, means to stabilize the rods to a radial attitude comprising a forked inner end integral with each rod and embracing the crankpin, all said forked ends being similarly tilted from the plane of rotation to afford overlap of the forked ends of adjacent rods.

4. In a radial connecting rod system, a crankpin having opposed members in which are formed opposed annular tracks, a plurality of similar rods each having bearing shoes articulately mounted thereon and engaging said tracks, and means to stabilize the rods to a radial attitude relative to the crankpin comprising a crankpin-embracing fork integral with the inner end of each rod, said forks being tilted from the plane of rotation to allow of overlap of the forks of adjacent rods during operation.

5. In a radial connecting rod system, a crankpin having opposed members in which are formed opposed annular tracks, a plurality of similar rods each having bearing shoes articulately mounted thereon and engaging said tracks, and means to stabilize the rods to a radial attitude relative to the crankpin comprising a crankpin-embracing fork integral with the inner end of each rod, said forks being tilted from the plane of rotation to allow of overlap of the forks of adjacent rods during operation.

FERDINAND P. SOLLINGER.